UNITED STATES PATENT OFFICE.

CHARLES R. DOWNS, OF CLIFFSIDE, AND RALPH S. POTTER, OF GRANTWOOD, NEW JERSEY, ASSIGNORS TO THE BARRETT COMPANY, A CORPORATION OF NEW JERSEY.

SEPARATION OF META AND PARA CRESOLS.

1,364,547.  Specification of Letters Patent.  Patented Jan. 4, 1921.

No Drawing.  Application filed April 10, 1919. Serial No. 288,944.

*To all whom it may concern:*

Be it known that we, (1) CHARLES R. DOWNS and (2) RALPH S. POTTER, citizens of the United States, residing at (1) Cliffside and (2) Grantwood, in the counties of (1) Bergen and (2) Bergen and States of (1) New Jersey and (2) New Jersey, have invented certain new and useful Improvements in the Separation of Meta and Para Cresols, of which the following is a specification.

Commercial cresylic acids as known to the trade contain ordinarily the three isomeric cresols—ortho, meta and para—in the same proportions relative to each other as they occur in coal tar. The ortho-cresol may be very completely removed from this mixture in a substantially pure condition by a repeated or column distillation, but since the boiling points of the meta and para cresols are so nearly the same, chemical means must be used for their separation. Many chemical processes have been proposed to gain this end, a large number of which depend upon the solfonation of the cresols by various strengths of sulfuric acid and the separation of the sulfonic acids or their salts. By these methods the meta-para cresol mixture is sulfonated completely or in part to the mono- or disulfonic acids by adding sulfuric acid or oleum. During the reaction, water is formed as represented by the equation

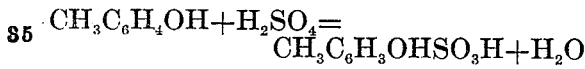

and an excess of the sulfuric acid over the theoretically required amount is needed to absorb the liberated water and still leave sulfuric acid of the correct concentration to finish the sulfonation to the desired degree.

Since it has been found that meta-cresol is more easily sulfonatable than para-cresol, several methods have been proposed for the separation of these two compounds by sulfonating the former and removing the unsulfonated latter.

In these processes the mixture of unsulfonated and sulfonated cresols are treated with a solvent, such as benzene, to remove the unsulfonated portion and then the residue is steam distilled at atmospheric pressure and around 110–120° C. in order to break up the meta-cresol mono-sulfonic acid, whereupon the meta-cresol is carried over by the steam, and condensed with the water.

However, following the known procedure there is present in the reaction vessel, in immediate contact with the cresols, a relatively large excess of concentrated sulfuric acid at the start of the sulfonating operation and a large amount of dilute sulfuric acid at the finish. This is objectionable both because the concentrated sulfuric acid tends to sulfonate more para-cresol than is desirable, and because there is a large amount of dilute sulfuric acid that is unreactive which increases the cost of the operation.

We have discovered that gaseous sulfuric anhydrid when passed into a mixture of meta and para-cresol will selectively sulfonate the meta-cresol to a relatively large degree in a single treatment if the conditions are properly controlled. This takes place without the formation of water or sulfuric acid and for this reason this invention is particularly advantageous on account of the absence of excess sulfuric acid, as will be evident as the description proceeds.

We have also found that substantially all of the unsulfonated para-cresol may be separated from a mixture of water, meta-cresol sulfonic acid and unsulfonated para-cresol by mere distillation in vacuum in the presence of steam, without decomposing an appreciable amount of the meta-cresol sulfonic acid, when no appreciable amount of sulfuric acid is present. After a substantial portion of the para-cresol has been distilled off the vacuum may be released, the temperature raised to about 120° C. and the sulfonated meta-cresol decomposed by steam and collected in the distillate by the well known method. Another advantage of the absence of sulfuric acid is that if a meta-cresol of very high purity is desired, the heating may be discontinued after para-cresol has been removed and the meta-cresol monosulfonic acid allowed to crystallize from the solution, which may be filtered and the meta-cresol sulfonic acid crystals later decomposed in the usual way. The presence of sulfuric acid would not permit the concentration of the material in the distillation step under a vacuum to a point where the meta-cresol sulfonic acid would crystallize out. The filtrate from the crystallization containing the remaining meta-cresol sulfonic acid, unremoved para-cresol and para-cresol sulfonic acid, if any, may be subjected to steam distillation at about 120° C. and the liberated cresols thereby regained for use or for further purification by the use of sulfuric anhydrid or other well known processes.

Having now described the principles upon which this invention is based we will give an example of an application of the process to a commercial mixture of meta and para-cresols, it being understood that the details of the procedure may be altered without departing from the spirit and scope of the invention.

In carrying out this process gaseous sulfuric anhydrid is caused to pass into an agitated liquid mixture of meta and para-cresols. This gaseous sulfuric anhydrid may, for example, be direct from a contact sulfuric acid system or it may be mixed with unreacting gases which mixture is commonly made by passing measured volumes of the unreacting gases over solid sulfuric anhydrid or through oleum in a container maintained at the proper temperature. The particular method of obtaining the sulfuric anyhydrid or the source from which it is obtained is immaterial to this process. The sulfuric anhydrid passing into the mixture of meta and para-cresols selectively sulfonates the meta isomer without the formation of water. The sulfonation is preferably started while maintaining the temperature of the liquid cresols at about 15° C. and allowing the temperature to rise slowly, as the viscosity of the batch increases, until it reaches a maximum of about 50° C. By maintaining approximately these temperature conditions, substantially no disulfonic derivatives are formed, and if any para-cresol mono-sulfonic acid is formed it is only in relatively small amounts. It is, however, understood that these temperature limits are merely approximate and that these exact temperatures are not a necessary prerequisite for practising this invention.

When the mixed cresols have taken up an amount of sulfuric anhydrid theoretically sufficient to form the monosulfonic acid of the meta-cresol present the addition of sulfuric anhydrid is stopped. Water is then added in equal volume to the sulfonated charge, air is exhausted, heat is applied to the evacuated sulfonating vessel, steam is injected to distil off the para-cresol, which is collected, while the temperature of the charge in the still is kept at 70° C. or thereabout. This operation is continued until substantially all of the unsulfonated cresol is distilled off. If it is merely desired to produce a meta-cresol of 80% purity, the vacuum is released and the sulfonated residue in the still is then decomposed by raising the temperature to about 120° C. and injecting steam. If a meta-cresol of higher purity is desired the meta-cresol sulfonic acid is crystallized out of solution by simple cooling, and is then filtered and decomposed with steam. The filtrate from this crystallization is also decomposed by steam at about 120° C. to regain all of the meta-cresol.

The unsulfonated para-cresol may be extracted from the condensed water of the original vacuum steam distillation and converted into a very pure product by freezing and whizzing. Instead of removing the unsulfonated cresol by steam vacuum distillation after the treatment of the mixture with sulfuric anhydrid and addition of water as above described, the unsulfonated para-cresol may be removed from the meta-cresol sulfonic acid by using a suitable solvent such as benzene for the unsulfonated cresol.

In this process no complicated or delicate apparatus is required; sulfuric acid is not present in the solution to interfere with the ready crystallization of the meta-cresol mono-sulfonic acid therefrom; and no water is formed during the sulfonation so that there is no loss due to a dilution of the sulfonating agent.

We claim:

1. The herein described process which comprises distilling a mixture containing meta-cresol sulfonic acid and para-cresol in vacuum in the presence of steam at such a temperature that para-cresol is removed from the mixture and meta-cresol sulfonic acid is not decomposed to an appreciable extent.

2. The herein described process which comprises distilling in the presence of steam a mixture containing meta-cresol sulfonic acid and para-cresol in vacuum, at a temperature of about 70° C.

3. The herein described process which comprises distilling a mixture containing meta-cresol sulfonic acid and para-cresol in vacuum by means of steam, said mixture being substantially free from sulfuric acid.

4. The herein described process which comprises distilling a mixture containing meta-cresol sulfonic acid and para-cresol in vacuum in the presence of steam, and recovering meta-cresol from the residue.

5. The herein described process which comprises distilling a mixture containing meta-cresol sulfonic acid and para-cresol in vacuum in the presence of steam, and recovering para-cresol from the distillate.

6. The herein described process which comprises distilling a mixture containing meta-cresol sulfonic acid and para-cresol in vacuum by means of steam to remove para-cresol, collecting the distillate, releasing the vacuum, and steam distilling the meta-cresol sulfonic acid at about 120° C.

7. The herein described process which comprises treating a mixture of meta- and para-cresol with gaseous $SO_3$ in amount sufficient to sulfonate the meta-cresol without sulfonating an appreciable amount of the para-cresol at temperatures between 15° C. and 50° C. and subsequently separating the sulfonated and unsulfonated products.

In testimony whereof we affix our signatures.

CHARLES R. DOWNS.
RALPH S. POTTER.